United States Patent [19]

Schleicher et al.

[11] Patent Number: 4,968,090
[45] Date of Patent: Nov. 6, 1990

[54] FRAME ARRANGEMENT FOR A VEHICLE ROOF

[75] Inventors: Bernd Schleicher, Munich; Alfons Lutz, Emmering; Hans Jardin, Inning; Karl Dworschak, Munich; Peter Wolf, Neuss, all of Fed. Rep. of Germany

[73] Assignee: Webasto AG Fahrzeugtechnik, Stockdorf, Fed. Rep. of Germany

[21] Appl. No.: 481,819

[22] Filed: Feb. 20, 1990

Related U.S. Application Data

[63] Continuation of Ser. No. 233,450, Aug. 18, 1988, abandoned.

[30] Foreign Application Priority Data

Aug. 20, 1987 [DE] Fed. Rep. of Germany ....... 3727719

[51] Int. Cl.$^5$ ............................................. B60J 7/057
[52] U.S. Cl. ...................................... 296/223; 296/216
[58] Field of Search .......... 233/450; 296/216, 221-223

[56] References Cited

U.S. PATENT DOCUMENTS

| | | | |
|---|---|---|---|
| 3,075,807 | 1/1963 | Werner | 296/216 X |
| 3,290,087 | 12/1966 | Werner | 296/223 X |
| 3,822,912 | 7/1974 | Bienert | 296/223 |
| 4,293,161 | 10/1981 | Lutz | 296/213 |
| 4,312,533 | 1/1982 | Jardin et al. | 296/214 |
| 4,332,416 | 6/1982 | Lutz et al. | 296/216 |
| 4,671,565 | 6/1987 | Grimm et al. | 296/216 |
| 4,749,227 | 6/1988 | Bienert et al. | 296/221 |
| 4,752,099 | 6/1988 | Roos et al. | 296/223 |

FOREIGN PATENT DOCUMENTS

| | | |
|---|---|---|
| 1680066 | 9/1973 | Fed. Rep. of Germany . |
| 2046996 | 7/1977 | Fed. Rep. of Germany ...... 296/222 |
| 2836801 | 3/1980 | Fed. Rep. of Germany ...... 296/223 |
| 3223750 | 1/1985 | Fed. Rep. of Germany . |
| 3532103 | 3/1987 | Fed. Rep. of Germany . |

Primary Examiner—Dennis H. Pedder
Attorney, Agent, or Firm—Sixbey, Friedman, Leedom & Ferguson

[57] ABSTRACT

A frame arrangement for a vehicle roof of the type having a roof opening which can be closed and selectively at least partially opened by displacement of a cover panel by actuating cables, the cover being guided by guide element tracks on the side parts of a support frame. According to the invention, the frame arrangement is provided with a guide part, which is set on the frame and which contains guide channels for the actuating cables and forms an upper sliding surface of the lateral tracks for the guide element. Advantageously, the guide part is constructed of a U shape that extends over the side parts and the front side of the frame. Preferably, this guide part is produced of plastic, while the frame consists of a sheet metal part.

17 Claims, 2 Drawing Sheets

FRAME ARRANGEMENT FOR A VEHICLE ROOF

This application is a continuation of Ser. No. 233,450, filed Aug. 18, 1988, now abandoned.

BACKGROUND OF THE INVENTION

The invention relates to a frame arrangement for a vehicle roof that has a roof opening that can be closed by a cover panel, which is slidably and/or swingably displaceable to at least partially uncover the roof opening, and which is supported by a frame perimetrically bounding the roof opening. In particular, to such an arrangement wherein at least one guide element is disposed at each side of the cover panel and along which the cover panel is longitudinally slidable on tracks provided on side parts of the frame by a respective actuating cable that is guided in a cable channel and connected to an actuating device.

From German Offenlegungsschrift No. 35 32 103 and U.S. Pat. No. 4,749,227 frame arrangements for a vehicle roof of the above-mentioned type are known. In these known arrangements, the frame is provided with grooves that form a part of the cable guide channels. Connected to the frame, over these grooves constructed in the frame, is a cover rail which closes the open sides of the grooves to form cable guide channels that are closed on all sides. This cover rail extends beyond the grooves in the frame to form laterally running tracks for the guide element or elements of the cover in conjunction with an appropriate guide surface that is constructed on the frame. With this configuration a covering rail is, thus, necessary, and only after its attachment to the frame can the operational movement mechanics for the movable cover panel be tested and, optionally, readjusted appropriately. Thus, operational testing is possible only after the final assembly of the sliding or sliding-tilting roof. Further, this additional part, the cover rail, is utilized, in each case, only on the side parts of the frame, so that a separate part is required for channeling the cables at the front side of the frame which, of course, further complicates assembly of the roof. Also, in the case of the arrangement of German Offenlegungsschrift No. 35 32 103, at the transitions between the laterally provided cover rails and the separate front part misalignment unavoidably occurs, even if usually slight, between the grooves provided in the frame for the guide channels of the actuating cable, so that, because of this circumstance, a stiffness of the actuation and sometimes an undesirable production of noise may result.

A vehicle roof is known from U.S. Pat. No. 4,293,161 that has a frame consisting of plastic which, on the one hand, has sliding surfaces for the guide elements or guide shoes for the cover panel and, on the other hand, guide channels for the actuating cable. Here also, the grooves in the frame partially define the guide channels for the actuating cable and are covered by covers which, simultaneously, form, on the side parts of the frame, a sliding surface for the guide shoes. In this case, essentially the same or similar difficulties occur as in the above-mentioned arrangements.

From U.S. Pat. No. 3,822,912, a cable drive and guide for a sliding cover panel of a vehicle roof is known, wherein a sheet metal part is fastened to the frame as a covering that forms, in conjunction with a suitably constructed profile of the frame and another sheet metal part fastened to the frame, a guide channel or channels for the actuating cable, and tracks for the guide elements of a suitable extension of the cover panel. With this configuration, at least three interacting parts are, thus, needed for the formation of the tracks and the cable channels, by which the assembly is made more difficult and production becomes more expensive.

From German Auslegeschrift Nos. 16 80 066 and 20 46 996, sliding roof constructions are known for motor vehicles that have separate guide strips, and from the guide strips are formed closed cable guide channels for guide elements, such as guide shoes or the like. Here also, transition areas occur between the side parts of the guides and cable guide channels provided there and the cable guide channels provided correspondingly on the front side, which entail the above-mentioned difficulties.

In U.S. Pat. No. 4,332,416, a vehicle roof is disclosed in which the guide channels with the incorporated actuating cables and the tracks with the incorporated guide elements are combined into an installation unit which can be preassembled and which is then set into a frame perimetrically bounding the roof opening. Since this installation unit contains all the operational parts of the sliding roof (except for the frame). the operational testing can take place right before installation. However, in this arrangement there are, again, transition areas from the side parts to the front side that are subject to potential misalignment problems and, on the other hand, the frame has only a supporting function, since the tracks and the cable guide channels are associated only with the installation unit. In this way a greater overall height results which, usually with regard to headroom in the interior of the passenger compartment of a vehicle, is undesirable.

SUMMARY OF THE INVENTION

Thus, primary objects of the invention are to overcome the initially described difficulties, and to provide a frame arrangement for a vehicle roof of the initially mentioned type, which has as small an overall height as possible, makes possible an operational testing of the actuating device and the parts working together with it before final assembly, and which can be assembled from as few individual parts as possible.

These objects are achieved by a frame arrangement of the initially described type which, according to the invention, is provided with a guide part, that is mounted on the frame, that contains the cable guide channels and forms the upper sliding surface of the tracks for the guide element of the cover panel.

With the configuration according to a preferred embodiment of the invention, several functions are combined in the guide part provided on the frame. In particular, the guide part contains the necessary cable guide channels and, in addition, borders the upper area of the tracks, while the lower area of the tracks is formed by the frame mounted along the perimeter of the roof opening. Thus, the guide part also takes on the covering function for the sliding tracks and the guide channels, so that the number of parts to be assembled can be minimized. At the same time, an interaction of the guide part with the frame is accomplished, so that an operationally essential task is also allocated to the frame and it does not, as previously customary in some arrangements, have only a support function; yet, due to the cable guide channels being constructed in the guide part, the actuating cables may be inserted into the guide part and can be held there before the guide part is installed on the frame. This yields considerable advantages with regard to a simplified assembly of the such a frame arrangement.

Preferably, the guide part has an approximately T-shaped cross section with the cable guide channels being constructed in the vertical base leg of the T shape, and the upper sliding surface of the lateral tracks being formed by the transversely extending arms of the T shape. Due to this configuration, the guide part has sufficient inherent rigidity. Furthermore, axial misalignments of the cable guide channels can reliably be avoided, since the guide part wraps around the front of the aperture defined by the frame from one lateral side to the other, thereby enabling the full length of the cable guide channels to be confined to the guide part itself.

In a preferred embodiment according to the invention, the preceding feature is achieved by a guide part that is constructed in a one-piece, U-shaped form that extends over the area of both opposite side guides as well as the front side of the frame. By this type of configuration, in particular, transition areas between the side parts and the front side of the frame are avoided, for example, so that a smooth guiding of the actuating cable can be guaranteed without additional bending load on the transition areas. Likewise, a silent functioning of the mechanics is made possible and, further, the assembly is simplified, since the guide part is a single piece and, as such, is set as a whole on the frame and is then solidly connected to the frame.

For inserting and setting in the guide elements, and for maintenance and repair purposes, with such a one-piece configuration of the guide part, the guide part has at least one access opening that can be closed by a closure plate so that, after installation of the guide part, readjustments or maintenance work can still easily be done. Suitably, this closure plate is provided on the top side of the guide part so that it is easily accessible.

According to advantageous further developments according to the invention, other functional parts can also be connected to the guide part or may be formed as a portion of the one-piece guide part. Such parts may include, for example, safety detents for the cover on the side parts and/or a catch projection on the front side. This makes it possible for the guide part to combine still other functions, namely, safety of the cover in the closed position.

For reasons involving production engineering, and for reasons involving weight reduction, the guide part is, preferably, produced of plastic, for example a thermoplastic. In particular, sheet molding compounds are preferred for the production of the guide part. With this method of production, a sufficiently precise production accuracy can be guaranteed.

A particular material favored for at least that portion of the frame which interacts with the plastic guide part, with regard to the tracks for the side guides, is a sheet metal part.

The guide part of the frame arrangement according to the invention is solidly connected to the frame, after the frame is set into the roof opening, for example with the aid of screws or the like. With this kind of configuration, the advantage results that there are no limits with regard to the method of installation, so that, for example, the frame can be produced and installed directly by the vehicle manufacturer, while the roof part that can be opened and closed is produced as a completely preassembled unit by a special supplier and then has only to be mounted on the frame in the vehicle manufacturing plant. On the other hand, the frame arrangement can also be offered together with, the guide part as a packaged unit.

Advantageously, the guide part has, in the area of the side parts, a longitudinal slot that serves to connect the actuating cable with the guide element, which, for example, is formed by guide shoes or the like. Thus the connections of actuating cable and guide elements can already be taken into account during the production of the guide part.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE PREFERRED EMBODIMENT

Figure 1:
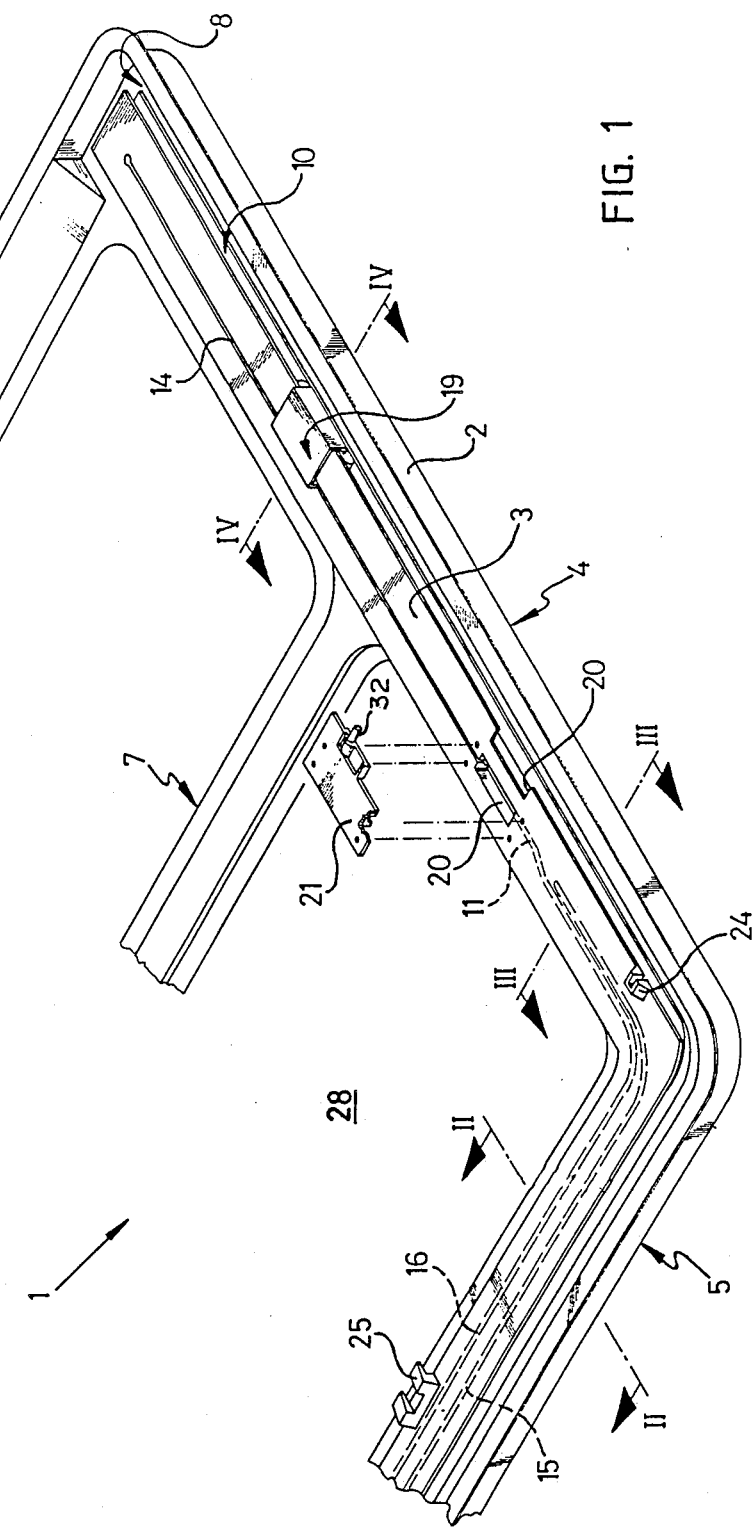
FIG. 1 is a perspective partial view of a frame arrangement according to the invention.

In the figures of the drawing, the frame arrangement is designated, overall, by reference numeral 1. Frame arrangement 1 comprises a frame 2 and a guide part 3. In the example represented, frame 2 suitably consists of a sheet metal part having an aperture 28, The sheet metal frame 2 is mounted to perimetrically bound roof opening 31 formed in a fixed roof surface 29 with aperture 28 underlying roof opening 31. A cover panel 30 serves for closing and selectively, at least partially, uncovering roof opening 31, while a similar function is served, relative to aperture 28, by an unillustrated slidable interior headliner in a manner as depicted in FIG. 9 of the above-noted U.S. Pat. No. 4,749,227, for example.

Frame 2 has side parts 4 (only the one on the right is represented in FIG. 1), a front side 5 and a rear side 6. A transverse reinforcement 7 is provided between front side 5 and rear side 6. In the example represented, a drip molding 8 with a raised edge is formed on frame 2 and is in an outer area of frame 2. At each of opposite lateral sides of aperture 28, frame 2 is formed with a lower sliding surface 9 for a guide shoe track designated 10, overall. Since the side of frame 2 and of guide part 3, that is not represented in the drawing are constructed as mirror images of the side of the frame and guide part that is shown, the following detailed description of the illustrated parts will apply to the unillustrated side as well. The part of frame 2 bounding aperture 28 forms guides 27 for the unillustrated sliding interior headliner, not represented in more detail.

In the embodiment represented, guide part 3 is a one-piece element of a U-shaped form configured to extend across front side 5 and to run rearwardly therefrom along both lateral sides 4 of frame 2. Advantageously, guide part 3 is produced of plastic, such as, for example, of sheet molding compound (SMC). As can be seen particularly from FIGS. 2-4, guide part 3 has a T-shaped cross section and guide channels 11 for diagrammatically represented actuating cables 12, 12a. Guide channels 11 are formed in a longitudinally extending vertical base leg 13 of the T-shaped cross section of guide part 3. Through a longitudinal slot 14, which extends vertically through the guide part 3 to guide channel 11, a connection is then produced between one or more guide elements 19 (for example, in the form of a guide shoe) and a respective actuating cable 12, 12a so that these guide elements 19, with the aid of the associated actuating cables 12, 12a (which, for example, are conventional pressure-resistant threaded cables) can be moved along lateral tracks 10. Cover panel 30 is connected to guide element 19 so that displacement of elements 19 moves cover panel 30 in a corresponding way. Since the construction of these guide elements 19 and the manner in which cables 12, 12a are driven is conventional in the art, a more detailed description of it is unnecessary.

In the area of guide part 3 that is allocated to front side 5 of frame 2 (see especially FIG. 2), two adjacent guide channels 15 and 16 can be seen, which are formed in base leg 13 of guide part 3. In this area, provision is made to enable the actuating cables 12 and 12a to engage the drive pinion of an actuating device (not shown) which can be hand driven or power driven and which serves to displace cables 12, 12a in opposite directions as is conventional. For example, a section of base leg 13 may be eliminated to create an open space between the cable channels 15, 16 into which a drive pinion carried by frame 2 may be inserted so as to engage with both of the actuating Cables 12, 12a. Further, guide channels 11, 15 and 11, 16 are constructed in guide part 3 so that they do not cross, i.e., guide channels 11, 15, and 16 run without crossovers. For this purpose, guide channel sections for the trailing ends of actuating cables 12, 12a are also constructed in guide part 3 on the corner areas at the transition between front side 5 and lateral side parts 4.

An upper sliding surface 17 for the track 10 is also formed by guide part 3 and, in particular, by a transversely extending arm 18 of guide part 3, so that respective lateral tracks 10 for guide elements 19 are defined in conjunction with surface 9 of side part 4 of the frame. Advantageously, in the top side of guide part 3 (see FIG. 1), in the area of side parts 4 of the frame, at least one access opening 20 is constructed which can be closed by a closure plate 21. By this access opening 20, guide element or elements 19 can be inserted into the tracks 10 and actuating cables 12, 12a into the respective guide channels 11, 15, 16. If, for maintenance and repair purposes, the actuation mechanics are to be checked, easy access is possible, since closure plate 21 can be detached and then, through access opening 20, the mechanics can be inspected or, if necessary, replaced, without frame 2 and/or guide part 3 having to be disassembled. The closure plate may, advantageously, be formed with a link pin 32 of a cover pivoting mechanism, pin 32 corresponding to link pin 69 of a pivoting mechanism such as shown in previously mentioned U.S. Pat. No. 4,749,227, the substance of which is hereby incorporated by reference to the extent such may be necessary to a full understanding of this invention.

Further, in the corner area on the top side of guide part 3, a safety detent 24 is constructed which keeps the cover reliably in the closed position. Also, in the area of front side 5, about in the middle of it, a rearwardly directed catch projection 25 that also works with the cover, not represented, is formed on guide part 3. In this respect, it is noted that detent 24 and catch 25 are not novel, per se, only their incorporation into guide part 3. For example, detent 24 is similar in function to the elevated stop 76 of said U.S. Pat. No. 4,749,227, whereas catch 25 is similar in function to tongue 13 of German Pat. No. 3,223,750, the substance of which is, likewise, hereby incorporated by reference to the extent such may be necessary to a full understanding of this invention.

Figure 2:
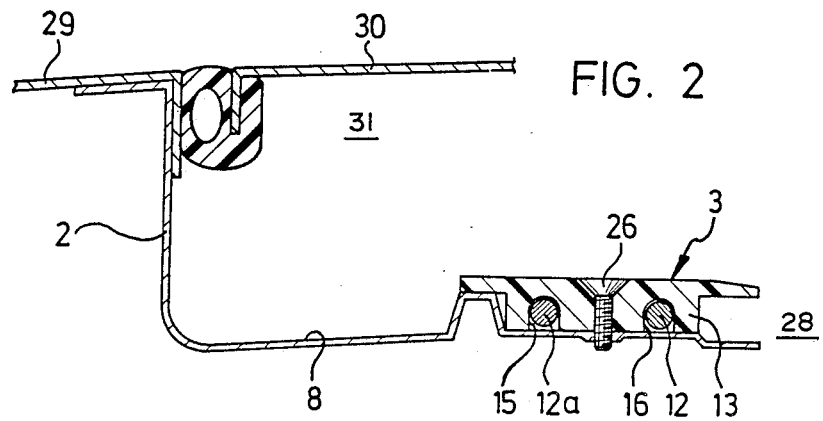
FIGS. 2 to 4 are sectional views taken along lines II—II, III—III, and IV—IV, respectively, in FIG. 1.
Figure 3:
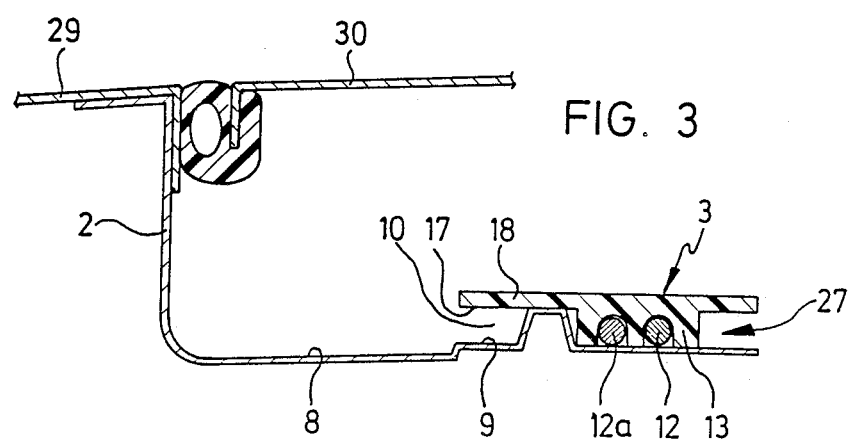
Figure 4:
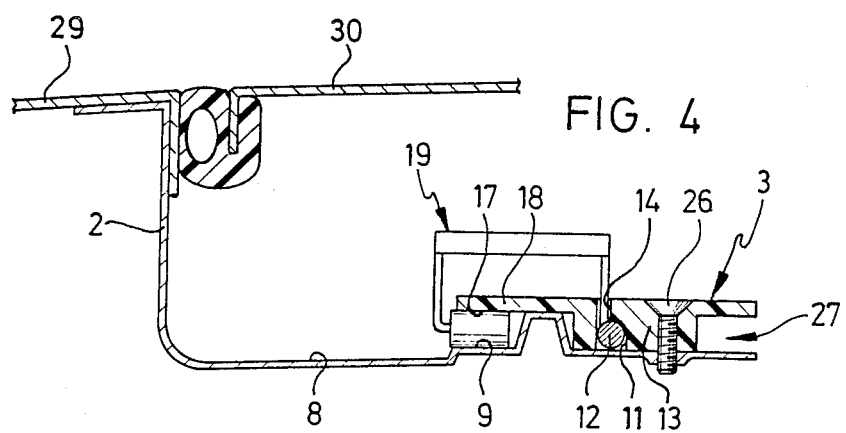

Guide part 3 with the further details described above is solidly connected, as represented in FIG. 2 and 4, to frame 2, for example, with the aid of screws 26. However, other forms of fixed attachment may be utilized. For example, guide part 3 can be attached to frame 2, for example, with the aid of clip connections, not represented, but known from such a prior arrangement as is described in the earlier mentioned U.S. Pat. No. 4,332,416.

As can be seen from the drawing, frame arrangement 1, according to the invention, makes possible an extremely flat construction which, in conjunction with guide part 3, comprises very few parts, so that a simplified assembly results. Since actuating cables 12, 12a are guided in guide part 3 without crossovers and since transition areas between the side parts 4 and the front side 5 are avoided with the one-piece construction of guide part 3, axial misalignments of side guide channels 11 with front guide channels 15, 16 are avoided, so that actuation of the cables is smooth and silent, as well as subject to very little wear.

If guide part 3 is produced for example of plastic and frame 2 consists of sheet metal, it can be beneficial to divide guide part 3 in a transverse direction to obtain a kind of expansion joint. In this way, compensation can be made for the differing coefficients of thermal expansion of sheet metal and plastic, so that a reliable movement of the cover in its tracks 10 is guaranteed even at elevated temperatures.

While we have shown and described various embodiments in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. Frame arrangement for a vehicle roof of the type having a roof opening in a fixed roof surface, a frame having tracks thereon at each of opposite lateral side parts thereof, a cover panel for closing and at least partially opening said roof opening, each of lateral sides of the cover panel being provided with at least one guide element that is slidable in one of the tracks of a respective lateral side part of the frame, and actuating cables at each of said opposite lateral side parts, one of the actuating cables at each lateral side part being connected to a respective guide element for producing displacement thereof; wherein a guide part containing cable guide channels is mounted on said frame, each of the actuating cables being guided in a respective one of the cable guide channels; wherein said tracks and cable guide channels are defined by lower surface portions of the guide part in conjunction with planar facing upper surface portions of the frame; wherein said guide part has an approximately T-shaped cross section shape having a base leg and transversely extending arms, and wherein said cable guide channels are constructed in said base leg and are closed by said upper surface portions of the frame; and wherein one of said lower surface portions of the guide part which defines the tracks is formed by one of said transversely extending arms.

2. Frame arrangement according to claim 1, wherein said guide part is constructed of a one-piece U-shaped form that extends from over a front area of one of said opposite lateral side parts, over a front side of said frame to the other of said opposite lateral side parts.

3. Frame arrangement according to claim 2, wherein an access opening is provided in said guide part as a means for inserting said actuating cables and guide element, and wherein a closure plate is provided as a means for covering said access opening.

4. Frame arrangement according to claim 3, wherein said access opening is provided on a top side of said guide part.

5. Frame arrangement according to claim 4, wherein a safety detent is formed on said guide part in the vicinity of corner areas at which said front side of the frame connects with said opposite lateral side parts.

6. Frame arrangement according to claim 5, wherein a rearwardly directed catch projection is formed on the guide part in the area of said front side of the frame.

7. Frame arrangement according to claim 6, wherein said guide part consists of plastic.

8. Frame arrangement according to claim 7, wherein said plastic is a thermoplastic sheet molding compound.

9. Frame arrangement according to claim 7, wherein said frame is constructed as a sheet metal part.

10. Frame arrangement according to claim 9, wherein said guide part, in the area of said opposite lateral side parts, has a longitudinal slot for connection of a respective actuating cable to a respective guide element.

11. Frame arrangement for a vehicle roof of the type having a roof opening in a fixed roof surface, a frame having tracks thereon at each of opposite lateral side parts thereof, a cover panel for closing and at least partially opening said roof opening, each of lateral sides of the cover panel being provided with at least one guide element that is slidable in one of the tracks of a respective lateral side part of the frame, and actuating cables at each of said opposite lateral side parts, one of the actuating cables at each lateral side part being connected to a respective guide element for producing displacement thereof; wherein a guide part containing cable guide channels is mounted on said frame, each of the actuating cables being guided in a respective one of the cable guide channels; and wherein each of said tracks are bounded by a lower surface portion of the guide part and a planar facing upper surface portion of the frame, and the cable guide channels are bounded by lower surface portions of the guide part and a planar surface portion of the frame.

12. Frame arrangement according to claim 11, wherein a safety detent is formed on said guide part in the vicinity of corner areas at which a front side of the frame connects with said opposite lateral side parts.

13. Frame arrangement according to claim 11, wherein a rearwardly directed catch projection is formed on the guide part in the area of a front side of the frame.

14. Frame arrangement according to claim 11, wherein said guide part consists of plastic.

15. Frame arrangement according to claim 14, wherein said plastic is a thermoplastic sheet molding compound.

16. Frame arrangement according to claim 14, wherein said frame is constructed as a sheet metal part.

17. Frame arrangement according to claim 11, wherein said guide part in the area of said opposite lateral side parts has a longitudinal slot for connection of a respective actuating cable to a respective guide element.

* * * * *